(12) United States Patent
Harmer

(10) Patent No.: US 12,182,832 B2
(45) Date of Patent: Dec. 31, 2024

(54) SELECTING A VIRTUAL CREDIT CARD FOR PURCHASING PRODUCTS FROM A MERCHANT FROM USER ACCOUNT INFORMATION

(71) Applicant: PayCertify, Inc., Reno, NV (US)

(72) Inventor: Robert Chase Harmer, Los Gatos, CA (US)

(73) Assignee: PAYCERTIFY, INC., Reno, NV (US)

( * ) Notice: Subject to any disclaimer, the term of this patent is extended or adjusted under 35 U.S.C. 154(b) by 0 days.

(21) Appl. No.: 17/332,122

(22) Filed: May 27, 2021

(65) Prior Publication Data
US 2021/0374785 A1 Dec. 2, 2021

Related U.S. Application Data

(60) Provisional application No. 63/030,441, filed on May 27, 2020.

(51) Int. Cl.
*G06Q 30/00* (2023.01)
*G06N 5/04* (2023.01)
(Continued)

(52) U.S. Cl.
CPC ........... *G06Q 30/0215* (2013.01); *G06N 5/04* (2013.01); *G06N 20/00* (2019.01); *G06Q 20/227* (2013.01); *G06Q 20/351* (2013.01)

(58) Field of Classification Search
CPC ....... G06Q 30/02–0277; G06Q 20/227; G06Q 20/351
See application file for complete search history.

(56) References Cited

U.S. PATENT DOCUMENTS 11,514,470 B2 * 11/2022 Jaladi ..................... G06Q 20/34
2013/0085869 A1 4/2013 Carlson et al.
(Continued)

FOREIGN PATENT DOCUMENTS

WO WO-2012082155 A2 * 6/2012 ......... G06Q 30/0207

OTHER PUBLICATIONS

Broida, R., "Create virtual credit card numbers and get cash back from Privacy.com," cnet.com, Jun. 12, 2018, 3 pages, [Online][Retrieved Aug. 31, 2021], Retrieved from the internet <URL:https://www.cnet.com/tech/services-and-software/create-virtual-credit-card-numbers-and-get-cash-back-from-privacy-com/>.
(Continued)

*Primary Examiner* — Raquel Alvarez
(74) *Attorney, Agent, or Firm* — FENWICK & WEST LLP

(57) ABSTRACT

An online system receives financial account information for a user, such as debit card information, from a merchant system with which the user places an order. From the financial account information, the online system selects a virtual credit card providing one or more rewards, such as cashback, to the user. Based on characteristics of the order by the user, the online system identifies one or more offers, such as discounts or rebates, applicable to the order. The online system provides the virtual credit card information to the merchant system and stores the virtual credit card information, as well as information describing one or more identified offers for the order in association with the user and the virtual credit card, in an account maintained for the user. Rewards may be stored in the user's account at the online system for application when using the virtual credit card associated with the user.

22 Claims, 2 Drawing Sheets

(51) Int. Cl.
   *G06N 20/00* (2019.01)
   *G06Q 20/22* (2012.01)
   *G06Q 20/34* (2012.01)
   *G06Q 30/0207* (2023.01)

(56) References Cited

U.S. PATENT DOCUMENTS

| | | |
|---|---|---|
| 2013/0197991 A1 | 8/2013 | Basu et al. |
| 2013/0325681 A1 | 12/2013 | Somashekar et al. |
| 2014/0236672 A1 | 8/2014 | Yoder et al. |
| 2016/0086222 A1* | 3/2016 | Kurapati ............ G06Q 40/08 705/14.53 |
| 2016/0217446 A1 | 7/2016 | Fordyce et al. |

OTHER PUBLICATIONS

Privacy.com, "How does cashback work?," Nov. 2020, 3 pages, [Online][Retrieved Aug. 31, 2021], Retrieved from the internet <URL:https://support.privacy.com/hc/en-us/articles/360012750673-How-does-cashback-work->.

International Search Report and Written Opinion, Patent Cooperation Treaty Application No. PCT/US2021/034469, Aug. 31, 2021, 14 pages.

* cited by examiner

SELECTING A VIRTUAL CREDIT CARD FOR PURCHASING PRODUCTS FROM A MERCHANT FROM USER ACCOUNT INFORMATION

CROSS-REFERENCE TO RELATED APPLICATIONS

This application claims the benefit of U.S. Provisional Application No. 63/030,441, filed May 27, 2020, which is incorporated by reference in its entirety.

BACKGROUND

A merchant system offers various products for sale to users. For example, the merchant system presents information describing different goods or services to users and receives selections of goods or services from users. The merchant system receives payment from a user for products, such as goods or services, selected by the user and provides the products to the user after receiving payment.

Many users use debit cards or similar instruments that debit amounts for purchase directly from a user's financial account. While these allow users to purchase products from merchant systems, instruments directly debiting amounts from a user's financial account generally do not reward users for purchases. Other types of purchasing instruments, such as credit cards, can provide users with rewards, such as cashback or redeemable points, when users make purchases. These rewards may encourage users to make more frequent purchases. However, many users who use instruments that directly debit amounts from a user's financial account (e.g., debit cards, wire transfers, etc.) do not obtain rewards for purchases made through those instruments. This may limit a number of purchases made by those users or limit amounts of purchases that those users make.

SUMMARY

A merchant system offers various products for sale to users. For example, the merchant system presents information describing different goods or services to users and receives selections of goods or services from users. Subsequently, the merchant system receives payment information from a user for products selected by the users, allowing the user to purchase the selected products.

Via a client device, a user selects one or more products for purchase from a merchant system. The user generates an order including the one or more products for purchase via the client device and including an order amount specifying a combined cost of the one or more products included in the order. For example, the user selects products included in the order via one or more web pages associated with the merchant system and presented by the client device or via an application associated with the merchant system and executing on the client device. For example, the user selects one or more products offered by the merchant system for an order via the client device. When the user is ready to purchase the products included in the order, the user identifies the order to the merchant system via the client device and transmits financial account information from which the merchant system obtains compensation for the products in the order to the merchant system. In various embodiments, the financial account information is transmitted via a payment rail, or payment network, that moves money from a sender to a recipient, such as payment rails used by financial institutions issuing credit cards. The financial account information transmitted to the merchant system identifies a debit card of the user in various embodiments (e.g., a debit card account number, a debit card expiration date, and a card verification value for the debit card). In other embodiments, the financial account information is a bank account number or other information identifying a source from which funds are obtained.

The merchant system transmits the order amount and the financial account information to the online system. From the order amount and the financial account information, the online system requests the order amount from a financial institution corresponding to the financial account information for deposit into an account for the online system maintained at a financial institution for the online system. The financial institution for the online system may be different than the financial institution maintaining the financial account corresponding to the received financial account information from the client device. However, the financial institution for the online system also be the financial institution maintaining the financial account corresponding to the received financial account information from the client device. For example, the order amount is deposited in a for benefit of (FBO) account maintained at a financial institution for the online system.

The online system selects a virtual credit card based on characteristics of the one or more products selected for purchase. The virtual credit card offers a rewards program providing a reward to the user for purchases made via the virtual credit card. Example reward programs include a user receiving a percentage of a transaction amount as cashback or the user receiving points that may redeemed by one or more merchant system in exchange for transaction amounts. However, any suitable reward program may be used in conjunction with the virtual credit card in various embodiments. For example, the online system identifies rewards offered by different virtual credit cards for different products selected by the user for purchase, ranks the virtual credit cards by the identified rewards, and selects a virtual credit cards having a highest position in the ranking. In various embodiments, virtual credit cards offer different rewards for different categories of products being purchased or different categories of merchant systems (e.g. a percentage of cash back for purchases from grocery stores and a different percentage of cash back for dining). Example categories for merchant systems include: dining, travel, home improvement, groceries, fuel, online retailers, and any other suitable category. In various embodiments, the online system identifies a merchant category code associated with the merchant system and identifies a category of the merchant system corresponding to the identified merchant category code. The merchant category code may be included in the order along with information identifying the merchant system in various embodiments. For example, the online system selects a virtual credit card offering a maximum reward for purchases from a category including the merchant system.

While selecting the virtual credit card allows the user to accrue rewards from the financial institution issuing the virtual credit card, the online system identifies one or more geographic locations relevant to the order, such as a geographic location of the merchant system or a geographic location of the user. In some embodiments, an application associated with the online system executes on the client device, obtains location information from one or more location sensors included in the client device, and transmit the location information to the online system to identify the geographic location of the client device to the online system. From the identified geographic location, or geographic locations, the online system identifies one or more offers applicable to the order. For example, the online system compares criteria for offers available by the merchant system to the geographic location of the user or the geographic location of the merchant system and identifies offers including the geographic location or the user or the geographic location of the merchant system.

Additionally, the online system accesses one or more third party systems to identify one or more offers provided by a third party system applicable to the order. The online system compares criteria of offers by the one or more third party systems to characteristics of the order including geographic locations related to the order, the merchant system, one or more products included in the order, a total purchase amount of the order, and any other suitable characteristics of the order. Offers having at least a threshold amount of criteria satisfied by characteristics of the order are identified by the online system. The offers identified by the online system provide one or more benefits to the user for the order. Example benefits provided by an offer include: a discount for the purchase amount of the order, a rebate for the order, additional products for the user to receive, or any other suitable benefit provided in exchange for completing purchasing the order. This allows the online system to identify additional benefits to the user along with the reward offered by the selected virtual credit card based on characteristics of the order from the user. In various embodiments, the online system identifies offers applicable to the order based on any suitable characteristics of the order. In various embodiments, the online system retrieves prior orders by the user stored in a user profile maintained by the online system and accounts for products included in prior orders by the user when identifying one or more offers applicable to the orders. In some embodiments, the online system maintains a purchase model trained from prior orders by the user that outputs a probability of the user purchasing a product. The online system identifies offers corresponding to products for which the purchase model determines the user has at least a threshold probability of purchasing in some embodiments, allowing the online system to identify offers likely to be relevant to additional orders by the user. For example, the online system identifies offers applicable to orders including one or more of the identified products, allowing the online system to identify one or more offers potentially applicable to subsequent orders received from the user.

The online system stores an association between the account maintained for the online system at the financial institution and the virtual credit card and an association between the virtual credit card and an identifier of the user. In some embodiments, the online system also stores and an association between the virtual credit card and the financial account information for the user that the merchant system received and transmitted to the online system. Storing the virtual credit card in association with an identifier of the user allows the online system to subsequently retrieve the information identifying the virtual credit card for the user when the online system subsequently receives information identifying one or more orders from the user via the merchant system or via another merchant system. In various embodiments, the online system transmits information identifying the virtual credit card to the client device associated with the user, allowing the user to store the information identifying the virtual credit card for subsequent use in other transactions. For example, an application executing on the client device and associated with the online system acts as a virtual wallet and stores the information identifying the virtual credit card and may also store information identifying other financial accounts associated with the user (e.g., debit card account numbers, bank account numbers, etc.), allowing the user to subsequently select the virtual credit card or another a financial account from the application for use to complete a purchase. Additionally, the online system stores information describing the one or more identified offers in association with the user and in association with the selected virtual credit card.

The online system transmits the selected virtual credit card information to the merchant system. Additionally, the online system transmits information identifying one or more offers identified by the online system as applicable to the order along with the virtual credit card information. When charging the order amount, the merchant system accounts for one or more orders identified by the online system in conjunction with the selected virtual credit card. After the merchant system charges the order amount to the selected virtual credit card, the online system receives an indication the amount has been charged to the virtual credit card and allocates a reward from the selected reward program to the virtual credit card, while storing the reward in association with the user. For example, the reward is included into an account maintained for the user and accessible via an application associated with the online system (e.g., an application acting as a virtual wallet for the user). Additionally, rewards allocated to the user for subsequent purchases using the virtual credit card are added to the virtual credit card in various embodiments, allowing the user to use the issued virtual credit card for multiple purchases with rewards added to the issued virtual credit card from the transactions. Alternatively, rewards allocated to the user from purchases made via the virtual credit card are added to a different virtual credit card created for the user for the amount of the accrued rewards.

As the user makes purchases with the selected virtual credit card, rewards from the selected rewards program for the generated virtual credit card are allocated to the virtual credit card and stored in association with the user. The user may redeem the rewards stored in association with the user by transmitting a request to the online system 140. In some embodiments, the online system generates an additional virtual credit card for an amount of the reward stored in association with the user and transmits information identifying the additional virtual credit card to the user, allowing the user to use the additional virtual credit card in one or more transactions to redeem the rewards stored in association with the user from use of the virtual credit card. In other embodiments, the reward stored in association with the user is applied to a subsequent purchase that the user completes with the virtual credit card (or the user is prompted whether to apply the stored reward when making a later purchase with the virtual credit card). Alternatively, the request transmitted to the online system requests the online system transfer the rewards stored in association with the user to a financial account of the user.

Additionally, when the online system later receives information for an additional order from a merchant system 130, such as the merchant system from which the online system received information describing the order or another online system, the online system retrieves one or more offers stored in association with the user and evaluates the offers for applicability to the additional order. For example, the online concierge system compares information identifying the merchant system to merchant systems specified by the information identifying the additional order to determine whether an offer stored in association with the user is applicable to the additional order. In another example, the online concierge system compares information identifying the merchant system and one or more products included in the additional order to merchant systems and products corresponding to one or more orders stored in association with the user. In response to determining an order stored in association with the user is applicable to the additional order, the online system applies the order stored in association with the user to the additional order, allowing the online system to leverage one or more orders stored in association with the user to provide a benefit to the user on subsequent orders.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
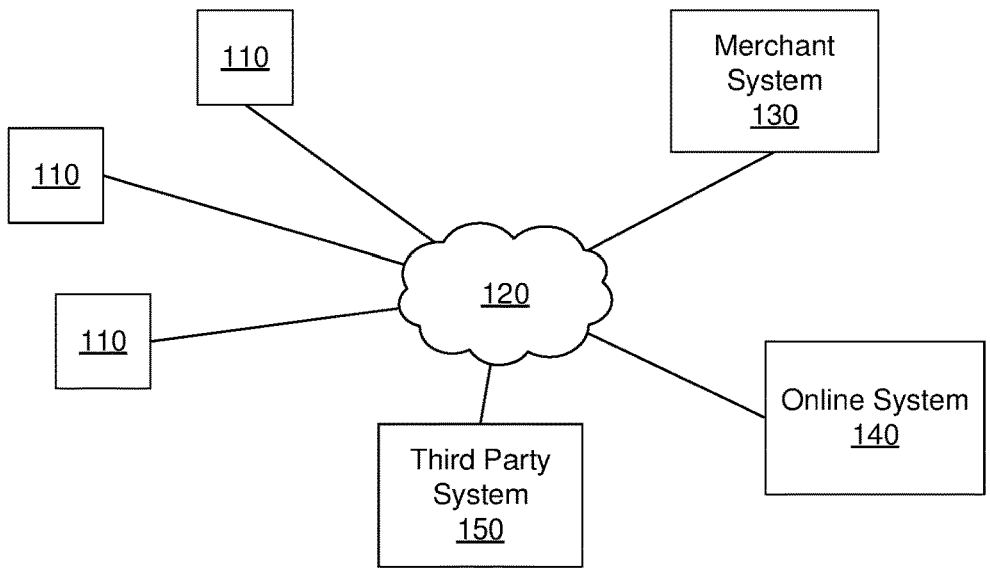
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, a merchant system 130, and the online system 140. In alternative configurations, different or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the merchant system 130, or other third party systems. For example, a client device 110 executes a browser application to enable interaction between the client device 110 and the merchant system 130 via the network 120. In another embodiment, a client device 110 interacts with the merchant system 130 through an application programming interface (API) running on a native operating system of the client device 110, such as IOS® or ANDROID™.

In various embodiments, a client device 110 executes an application associated with the online system 140 acting as a virtual wallet that stores information identifying different financial accounts for a user. For example, the application stores information identifying different credit cards or different debit cards associated with a user of the client device. The application also exchanges information with one or more financial institutions maintaining financial accounts identified to the application, allowing the application to identify account balances or available credit for different financial accounts. In some embodiments, the application also allows a user of the client device to identify completed transactions using a financial account selected via the application. The application may allow the user to identify completed or pending transactions based on different categories of transactions; for example, the application may group transactions based on merchant category codes, or other information identifying categories of merchant systems 130 with which transactions were completed via a selected financial account. One or more of the financial accounts included in the application may be virtual credit cards, such as those generated for the user by the online system 140, as further described below in conjunction with FIGS. 2 and 3. Additionally, the user may select a financial account via the application to complete a purchase of an order, authorizing the application to transmit information identifying the selected financial account to a merchant system 130 with which the order was created.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more merchant systems 130 may be coupled to the network 120 for communicating with the online system 140, which is further described below in conjunction with FIG. 2, and with a client device 110. While FIG. 1 shows a single merchant system 130 for purposes of illustration, in other embodiments, any number of merchant systems 130 may be coupled to the network 120. A merchant system 130 maintains information describing one or more products (e.g., goods or services) offered for purchase via the merchant system 130. In various embodiments, client devices 110 obtain the descriptions of one or more products from the merchant system 130 and present the obtained descriptions to users. Additionally, the merchant system 130 associates prices with different products. For example, the merchant system 130 associates a monetary amount with a product that is presented to a user in conjunction with a description of the product. Via a client device 110, a user selects one or more products offered by the merchant system 130 from descriptions of one or more products the client device 110 obtains from the merchant system 130 and provides the merchant system 130 with payment information for the merchant system 130 to obtain payment for the selected one or more products. In response to receiving the amount of compensation, the merchant system 130 provides the selected one or more products to the user.

In various embodiments, the merchant system 130 transmits various pages to the client device 110 for a user of the client device 110 to purchase products. For example, the merchant system 130 transmits a checkout page to a client device 110 that identifies products selected by a user of the client device 110 and includes one or more fields for the user to provide payment information for the identified products. Additionally, the merchant system 130 may transmit an order confirmation page to the client device 110 that is presented after the user identifies selected products to the merchant system 130 and provides payment information to the merchant system 130. By interacting with the order confirmation page, a user finalizes a purchase of products from the merchant system 130.

The online system 140 maintains one or more rules for selecting a virtual credit card for use in an order. Each virtual credit card from which the online system 140 selects provide a reward program for a user. A reward program is offered by a financial institution offering the virtual credit card and provides one or more benefits to a user when the virtual credit card is used to complete a transaction. For example, a reward provides a user with a percentage of a purchase amount completed with the virtual credit card as cash back. As another example, a reward program provides a user with a number of points capable of redemption at one or more merchant systems 130 based on an amount of a purchase completed with the virtual credit card. When receiving information describing an order from a merchant system 130 that identifies a user and financial account information of the user for use to complete the order, the online system 140 selects a virtual credit card for use to complete the transaction. As further described below in conjunction with FIG. 3, the online system 140 selects a virtual credit card for the user having a reward program maximizing a reward provided to the user. When selecting the virtual credit card, the online system 140 accounts for a category of a merchant system 130 from which the information describing the order was received. For example, the online system 140 determines a merchant category code of the merchant system 130 and selects a virtual credit card offering a maximum reward for the determined merchant category code. Hence, the online system 140 accounts for differences in financial institutions issuing virtual credit cards based on different criteria, allowing the online system 140 to route a request for issuing a virtual credit card to different financial institutions depending on different criteria being satisfied.

Additionally, as further described below in conjunction with FIG. 3, the online system 140 accesses the merchant system 130 and one or more third party systems 150 to identify one or more offers applicable to the order. An offer provides one or more benefits to the user for the order. The merchant system 130 or a third party system 150 provides the benefit to the user when the offer is redeemed. Example benefits provided by an offer include: a discount for the purchase amount of the order, a rebate for the order, additional products for the user to receive, or any other suitable benefit provided in exchange for completing purchasing the order. As further described below in conjunction with FIG. 3, the online system 140 accounts for characteristics of the order, such as a merchant category code or other identifier of the merchant system 130 from which information identifying the order was received or products included in the order, when identifying one or more offers. Additionally, the online system 140 may use information describing previous orders identifying the user to identify additional products the user may have at least a threshold probability of purchasing and identify orders applicable to the identified additional products, allowing the online system 140 to identify offers likely to be applicable to additional orders from the user.

The online system 140 receives information identifying a financial account of a user and an order amount for a purchase made by the user via a merchant system 130 from the merchant system 130. As further described below in conjunction with FIGS. 2 and 3, the online system 140 selects virtual credit card for the user and identifies one or more offers providing the user with one or more benefits from an order for the user identified by the information from the merchant system 130. The online system 140 associates the virtual credit card, which may be generated by the online system 140 or by a financial institution issuing the virtual credit card, stores information identifying the virtual credit card in association with the user in a user account for the user. The online system 140 also stores information identifying one or more offers the online system 140 identified for the user in the user account of the user Additionally, the online system 140 transfers information identifying the virtual credit card to the merchant system 130, which completes the purchase for the user via the virtual credit card. Rewards accrued from using the virtual credit card to complete the purchase via the merchant system 130 are stored by the online system 140 in association with the user account. Subsequently, the user may request the accrued reward from the online system 140, which transfers the reward to a financial account that the user identifies to the online system 140 or generates an additional virtual credit card for the amount of the accrued reward that is stored in association with the user and identified to the user, as further described below in conjunction with FIGS. 2 and 3.

Figure 2:
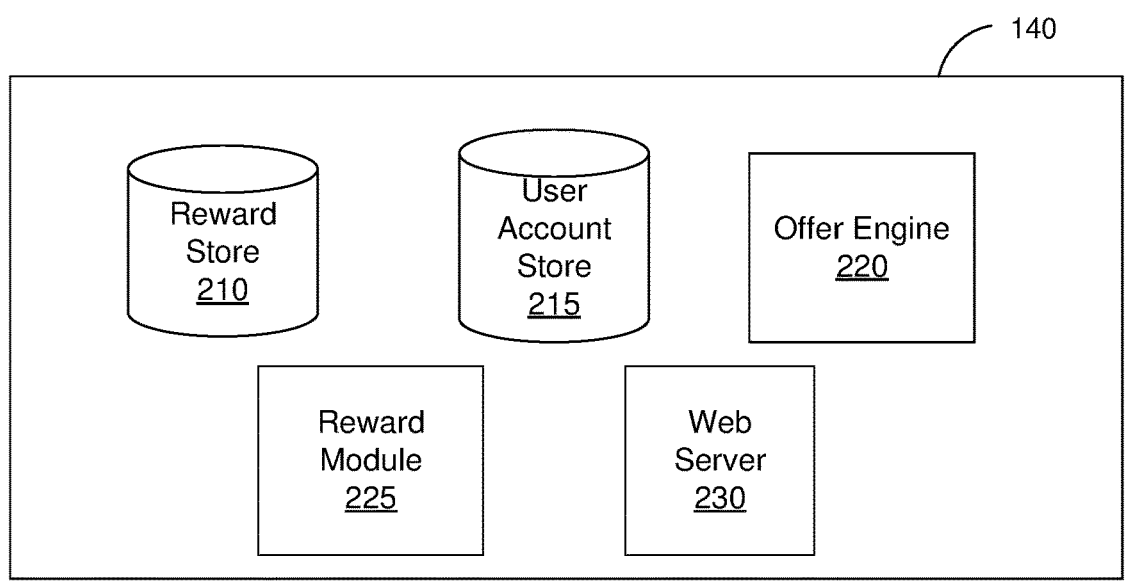
FIG. 2 is a block diagram of an online system, in accordance with an embodiment.

FIG. 2 is a block diagram of an architecture of the online system 140. The online system 140 shown in FIG. 2 includes a reward store 210, a user account store 215, an offer engine module 220, a reward module 225, and a web server 230. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

The reward store 210 maintains information identifying reward programs for virtual credit cards offered by one or more financial institutions. A reward program is offered by a financial institution offering a virtual credit card and provides one or more benefits to a user when the virtual credit card is used to complete a transaction. For example, a reward provides a user with a percentage of a purchase amount completed with the virtual credit card as cash back. As another example, a reward program provides a user with a number of points capable of redemption at one or more merchant systems 130 based on an amount of a purchase completed with the virtual credit card. Different rewards may be provided by a financial institution when a virtual credit card is used for different purchases. For example, a virtual credit card provides different rewards (e.g., a different percentage of cash back or a different number of points) when used for purchases from different merchant systems 130. In various embodiments, the rewards a virtual credit card provides is based on a category of a merchant system 130 fulfilling an order, and the reward store 210 associates a reward offered by a virtual credit card with a corresponding category of merchant system 130, such as with a merchant category code. In various embodiments, the reward store 210 maintains records for different financial institution, with each record including entries for a reward program and corresponding requirements for the reward program (e.g., a merchant category code, description of products to which the reward applies, etc.). The online system 140 updates the reward store 210 over time, such as at a periodic interval, to maintain a current record of rewards programs offered by various financial institutions for virtual credit cards.

The user account store 215 includes information identifying different users of the online system 140. For example, a user account includes a user identifier uniquely identifying a user and information describing the user. A user account also includes information identifying one or more virtual credit cards generated by the online system 140 and associated with the user. Further, a user account for a user includes financial account information identifying one or more financial accounts associated with the user. Example financial accounts associated with the user include a debit card account, a checking account, and a savings account. The user account store 215 may include additional information, such as a device identifier of a client device 110 associated with the user, an application identifier of an application executing on the client device 110 associated with the user, or any suitable information.

In various embodiments, a user account also includes information describing orders previously placed by a user corresponding to the user account. In various embodiments, the user account includes an identifier of an order and associates a time when the order was received, products included in the order, and a merchant system 130 (or a category of the merchant system 130) that received the order from the user with the identifier of the order. Other information describing an order, such as a total amount of the order, may be associated with the identifier of the order in various embodiments. This allows the user account to maintain information describing a history of orders placed by the user that used the online system 140, allowing the online system 140 to maintain information from which purchase patterns of the user may be identified.

The offer engine 220 identifies one or more offers applicable to an order for which the online system 140 receives information. For example, the offer engine 220 compares criteria for offers available by the merchant system 130 to the geographic location of the user or the geographic location of the merchant system 130 and identifies offers including the geographic location or the user or the geographic location of the merchant system 130. The offer engine 220 may access one or more third party systems 150 to identify one or more offers provided by a third party system 150 applicable to the order, as further described below in conjunction with FIG. 3. An offer identified by the offer engine 220 provides one or more benefits to the user for the order. Example benefits provided by an offer include: a discount for the purchase amount of the order, a rebate for the order, additional products for the user to receive, or any other suitable benefit provided in exchange for completing purchasing the order.

In various embodiments, the offer engine 220 retrieves prior orders by the user stored in a user account for the user maintained in the user account store 215. Based on products included in prior orders by the user, the offer engine 220 identifies one or more offers. In some embodiments, the offer engine 220 maintains a purchase model that outputs a probability of the user purchasing a product based on prior orders from the user included in a user account for the user. As further described below in conjunction with FIG. 3, the purchase model determines a probability of the user purchasing a product based on products previously purchased by the user. In various embodiments, the offer engine 220 identifies offers corresponding to products for which the purchase model determines the user has at least a threshold probability of purchasing in some embodiments, allowing the offer engine 220 to identify offers likely to be relevant to additional orders by the user.

The reward module 225 selects a virtual credit card for the user. In various embodiments, the reward module 225 selects a virtual credit card from the reward store 205 having a maximum reward for an offer identified to the online system 140. The reward module 225 may generate the selected virtual credit card. The virtual credit card includes information that uniquely identifies the virtual credit card. Information identifying the virtual credit card generated for a user is stored in a user account for the user included in the user account store 215. Additionally, the reward module 225 receives information identifying rewards accrued by a user from use of the virtual credit card generated for the user and stores the accrued rewards in the user account for the user in the user account store 210. As further described below in conjunction with FIG. 3, the reward module 225 may generate an additional virtual credit card for an amount corresponding to rewards accrued by the user or transfer the accrued rewards to a financial account (e.g., a checking account, a savings account) for the user in response to receiving a request from the user.

The web server 230 links the pricing server 140 via the network 120 to the one or more client devices 110, as well as to the merchant system 130. The web server 230 serves web pages, as well as other content, such as JAVA®, FLASH®, XML and so forth. The web server 230 may receive and route messages between the pricing server 140 and the merchant system 130, for example, instant messages, queued messages (e.g., email), text messages, short message service (SMS) messages, or messages sent using any other suitable messaging technique. The web server 230 receives information describing purchases by users of a merchant system 130 via a client device 110 via the merchant system 130 or via the client device 110 that the credit determination module 215 compares to one or more conditions in the condition store 210 associated with the merchant system 130. Additionally, the web server 230 may provide application programming interface (API) functionality to send data directly to native client device operating systems, such as IOS®, ANDROID™, or BlackberryOS.

Generating a Virtual Credit Card for a User From User Account Information

Figure 3:
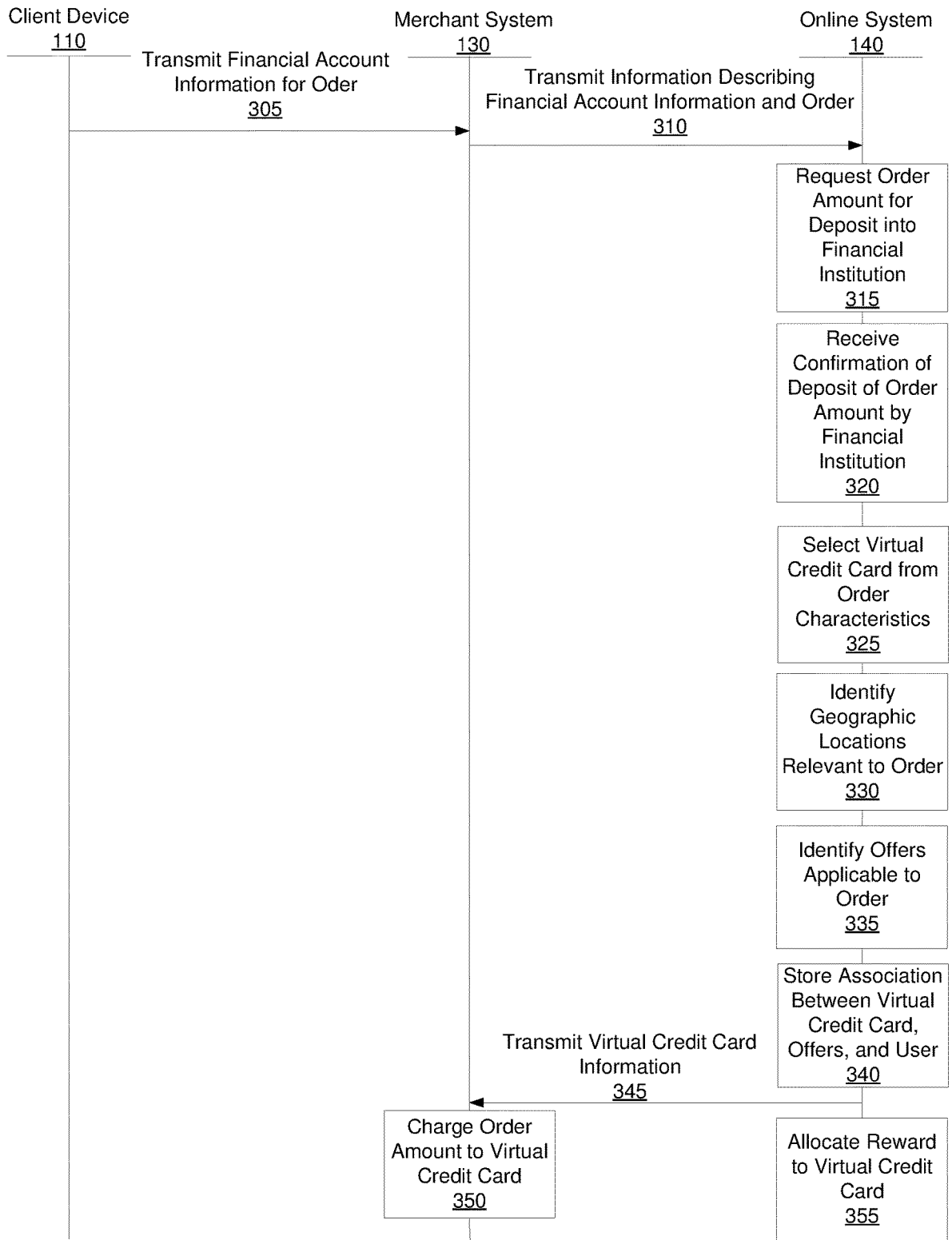
FIG. 3 is an interaction diagram of a method for an online system generating a virtual credit card for a user for one or more purchases via a merchant system from financial account information provided by the user, in accordance with an embodiment.

FIG. 3 is an interaction diagram of one embodiment of a method for an online system 140 generating a virtual credit card for a user for one or more purchases via a merchant system 130 from financial account information provided by the user. The method may include different or additional steps than those described in conjunction with FIG. 3 in various embodiments. Further, the steps of the method may be performed in different orders than the order described in conjunction with FIG. 3 in various embodiments.

Via a client device 110, a user selects one or more products for purchase from a merchant system 130. The user generates an order including the one or more products for purchase via the client device 110 and including an order amount specifying a combined cost of the one or more products included in the order. For example, the user selects products included in the order via one or more web pages associated with the merchant system 130 and presented by the client device 110 or via an application associated with the merchant system 130 and executing on the client device 110. For example, the user selects one or more products offered by the merchant system 130 for an order via the client device 110. When the user is ready to purchase the products included in the order, the user identifies the order to the merchant system 130 via the client device and transmits 305 financial account information from which the merchant system 130 obtains compensation for the products in the order to the merchant system 130. The financial account information transmitted 305 to the merchant system 130 identifies a debit card of the user in various embodiments (e.g., a debit card account number, a debit card expiration date, and a card verification value for the debit card). In other embodiments, the financial account information is a bank account number or other information identifying a source from which funds are obtained.

The merchant system 130 transmits 310 the order amount and the financial account information to the online system 140, along with information identifying the user. In some embodiments, the merchant system 130 includes information describing the order, such as one or more products included in the order, to the online system 140. From the order amount and the financial account information, the online system 140 requests 315 the order amount from a financial institution corresponding to the financial account information for deposit into an account for the online system 140 maintained at a financial institution for the online system 140. In various embodiments, the order amount is deposited into the account for the online system 140 via a payment platform or a payment network maintained by the financial institution for the online system 140. The financial institution for the online system 140 may be different than the financial institution maintaining the financial account corresponding to the received financial account information from the client device 110. However, the financial institution for the online system 140 also be the financial institution maintaining the financial account corresponding to the received financial account information from the client device 110. For example, the order amount is deposited in a for benefit of (FBO) account maintained at a financial institution for the online system 140.

In response to receiving 320 a confirmation from the financial institution that the order amount was deposited into the account for the online system 140 (i.e., receiving an indication the account for the online system 140 has been credited by the order amount), the online system 140 selects 325 a virtual credit card based on characteristics of the one or more products selected for purchase. The virtual credit card offers a rewards program providing a reward to the user for purchases made via the virtual credit card. Example reward programs include a user receiving a percentage of a transaction amount as cashback or the user receiving points that may redeemed by one or more merchant system 130 in exchange for transaction amounts. However, any suitable reward program may be used in conjunction with the virtual credit card in various embodiments. For example, the online system 140 identifies rewards offered by different virtual credit cards for different products selected by the user for purchase, ranks the virtual credit cards by the identified rewards, and selects 325 a virtual credit cards having a highest position in the ranking. In various embodiments, virtual credit cards offer different rewards for different categories of products being purchased or different categories of merchant systems 130 (e.g. a percentage of cash back for purchases from grocery stores and a different percentage of cash back for dining). Example categories for merchant systems 130 include: dining, travel, home improvement, groceries, fuel, online retailers, and any other suitable category. In various embodiments, the online system 140 identifies a merchant category code associated with the merchant system 130 and identifies a category of the merchant system 130 corresponding to the identified merchant category code. The merchant category code may be included in the order along with information identifying the merchant system 130 in various embodiments. For example, the online system 140 selects 325 a virtual credit card offering a maximum reward for purchases from a category including the merchant system 130. In other examples, the online system 140 determines a category for the order from products included in the order and selects 325 a virtual credit card offering a maximum reward for the determined category. Hence, the online system 140 accounts for characteristics of the order by the user to select 325 a virtual credit card that maximizes rewards offered to the user for completing the order with the virtual credit card.

While selecting 325 the virtual credit card allows the user to accrue rewards from the financial institution issuing the virtual credit card, the online system 140 identifies 330 one or more geographic locations relevant to the order, such as a geographic location of the merchant system 130 or a geographic location of the user. The geographic location of the merchant system 130 may be a geographic location of the merchant system 130 or a geographic location of a particular physical store communicating with the merchant system 130. The geographic location of the user may be obtained from a shipping or a billing address included in the order, from a user profile maintained by the online system 140 from the user, or obtained from the client device 110 from which the user selected the products for the order. In some embodiments, an application associated with the online system 140 executes on the client device 110, obtains location information from one or more location sensors included in the client device 110, and transmit the location information to the online system 140 to identify the geographic location of the client device 110 to the online system 140.

From the identified geographic location, or geographic locations, the online system 140 identifies 335 one or more offers applicable to the order. For example, the online system 140 compares criteria for offers available by the merchant system 130 to the geographic location of the user or the geographic location of the merchant system 130 and identifies 335 offers including the geographic location or the user or the geographic location of the merchant system 130. Additionally, the online system 140 accesses one or more third party systems 150 to identify 330 one or more offers provided by a third party system 150 applicable to the order. The online system 140 compares criteria of offers by the one or more third party systems 150 to characteristics of the order including geographic locations related to the order, the merchant system 130, one or more products included in the order, a total purchase amount of the order, and any other suitable characteristics of the order. Offers having at least a threshold amount of criteria satisfied by characteristics of the order are identified 335 by the online system 140. The offers identified 335 by the online system 140 provide one or more benefits to the user for the order. Example benefits provided by an offer include: a discount for the purchase amount of the order, a rebate for the order, additional products for the user to receive, or any other suitable benefit provided in exchange for completing purchasing the order. This allows the online system 140 identify additional benefits to the user along with the reward offered by the selected virtual credit card based on characteristics of the order from the user. In various embodiments, the online system 140 identifies 335 offers applicable to the order based on any suitable characteristics of the order.

In various embodiments, the online system 140 retrieves prior orders by the user stored in a user profile maintained by the online system 140 and accounts for products included in prior orders by the user when identifying 335 one or more offers applicable to the orders. For example, the online system 140 retrieves orders previously received from the user and identifies one or more products from the previously received orders from the user. The online system 140 retrieves offers associated with one or more of the identified products. In some embodiments, the online system 140 maintains a purchase model that outputs a probability of the user purchasing a product based on prior orders the online system 140 receives from the user. The purchase model accounts for times when the user previously purchased a product, such as a relative time from a previously received order including the product to a time when the model is applied, products included in received orders including the product, a merchant system 130 (or a category of merchant system) identified by prior orders including the product, and any other suitable information about orders including the product. Additionally, the purchase model accounts for a frequency with which the user purchases a product, which increases a likelihood of the user purchasing a product if the user more frequently purchases the product. Other example factors used by the purchase model to determine the likelihood of a user purchasing a product include: a time interval between prior orders including the product received from the user, a frequency with which the product is included in prior orders received from the user, times when orders including the product were previously received from the user, preferences of the product, and any other suitable information. The purchase model may be trained using any suitable method or combination of methods (e.g., supervised learning, unsupervised learning, semi-supervised learning, etc.) from orders the online system 140 previously received from the user, allowing the online system 140 to leverage prior orders to determine probabilities of the user purchasing one or more products. The online system 140 identifies 335 offers corresponding to products for which the purchase model determines the user has at least a threshold probability of purchasing in some embodiments, allowing the online system 140 to identify 335 offers likely to be relevant to additional orders by the user. For example, the online system 140 identifies 335 offers applicable to orders including one or more of the identified products, allowing the online system 140 to identify 335 one or more offers potentially applicable to subsequent orders received from the user.

The online system 140 stores 340 an association between the account maintained for the online system 140 at the financial institution and the virtual credit card and an association between the virtual credit card and an identifier of the user. In some embodiments, the online system 140 also stores 340 and an association between the virtual credit card and the financial account information for the user that the merchant system 130 received and transmitted to the online system 140. Storing the virtual credit card in association with an identifier of the user allows the online system 140 to subsequently retrieve the information identifying the virtual credit card for the user when the online system 140 subsequently receives information identifying one or more orders from the user via the merchant system 130 or via another merchant system 130. In various embodiments, the online system 140 transmits information identifying the virtual credit card to the client device 110 associated with the user, allowing the user to store the information identifying the virtual credit card for subsequent use in other transactions. For example, an application executing on the client device 110 and associated with the online system 140 acts as a virtual wallet and stores the information identifying the virtual credit card and may also store information identifying other financial accounts associated with the user (e.g., debit card account numbers, bank account numbers, etc.), allowing the user to subsequently select the virtual credit card or another a financial account from the application for use to complete a purchase. Additionally, the online system 140 stores 340 information describing the one or more identified offers in association with the user and in association with the selected virtual credit card. The association between the one or more identified offers and the user and the selected virtual credit card allow the identified orders to be more efficiently identified and retrieved for application to subsequent orders by the user. Hence, the online system 140 may identify 335 offers applicable to one or more products based on likelihood of the user subsequently purchasing the one or more products and store 340 information describing the identified offers for subsequent application to a later order from the user including the one or more products. For example, the online system 140 identifies candidate products from the received order and from one or more previously received orders from the user and applies the purchase model to each candidate product. In various embodiments, the online system 140 identifies candidate products as products included in a threshold number of orders, products included in orders with at least a threshold frequency, or any other suitable categories. In some embodiments, the online system 140 retrieves anonymized information describing previously received orders from other users including one or more common products as an order from the user, and identifies candidate products as products included in at least a threshold amount (e.g., a threshold number, a threshold percentage) of orders received from the other users that include one or more common products as an order received from the user. Based on the probabilities of the user purchasing various candidate products, the online system 140 identifies 335 offers applicable to one or more of the candidate products and stores 340 the offers in association with the user. For example, the online system 140 identifies 335 offers applicable to candidate products having at least a threshold probability of being purchased by the user or identifies 335 offers applicable to candidate products having at least a threshold position in a ranking of the candidate products based on corresponding probabilities of being purchased by the user. The online system 140 may update offers stored in association with the user over time in some embodiments. For example, the online system 140 removes offers from storage in association with the user when a date exceeds an expiration date specified by an offer stored 340 in association with the user.

The online system 140 transmits 345 the selected virtual credit card information to the merchant system 130. Additionally, the online system 140 transmits information identifying one or more offers identified 335 by the online system 140 as applicable to the order along with the virtual credit card information. For example, the online system 140 transmits a code or other information identifying an offer to the merchant system 130, allowing the merchant system 130 to apply the offer to the order using the information from the online system 140. The merchant system 130 charges 350 the order amount to the selected virtual credit card to complete the order. The online system 140 transmits an identifier of the order or other information identifying the order, as well as information identifying the user to the merchant system 130 along with the selected virtual credit card information and one or more offers, allowing the merchant system 130 to identify the order and the user to which the selected virtual credit card or identified offer is applied. When charging the order amount, the merchant system 130 accounts for one or more orders identified by the online system 140 in conjunction with the selected virtual credit card. After the merchant system 130 charges 350 the order amount to the selected virtual credit card 335, the online system 140 receives an indication the amount has been charged to the virtual credit card and allocates 355 a reward from the selected reward program to the virtual credit card, while storing the reward in association with the user. For example, the reward is included into an account maintained for the user and accessible via an application associated with the online system 140 (e.g., an application acting as a virtual wallet for the user). In various embodiments, the order amount is charged 335 to the virtual credit card via a payment platform or a payment network maintained by the financial provider that issued the virtual credit card. For example, the reward is a specified percentage of the order amount as cashback, so the online system 140 allocates 355 the specified percentage of the order amount as a credit to the virtual credit card and stores the specified percentage of the order amount in an account associated with the user. In other examples, the reward is a number of redeemable points based on the order amount, so the online system 140 allocates 355 a number of redeemable points to the virtual credit card and stores the number of redeemable points in association with the user.

Additionally, rewards allocated 355 to the user for subsequent purchases using the virtual credit card are added to the virtual credit card in various embodiments, allowing the user to use the issued virtual credit card for multiple purchases with rewards added to the issued virtual credit card from the transactions. Alternatively, rewards allocated 355 to the user from purchases made via the virtual credit card are added to a different virtual credit card created for the user for the amount of the accrued rewards. In various embodiments, a user provides the online system 140 with a setting or instructions specifying whether rewards accrued from purchases with the virtual credit card are added to the selected virtual credit card or a different virtual credit card is issued for the rewards accrued from purchases made with the selected virtual credit card.

As the user makes purchases with the selected virtual credit card, rewards from the selected rewards program for the generated virtual credit card are allocated 355 to the virtual credit card and stored in association with the user. The user may redeem the rewards stored in association with the user by transmitting a request to the online system 140. In some embodiments, the online system 140 generates an additional virtual credit card for an amount of the reward stored in association with the user and transmits information identifying the additional virtual credit card to the user, allowing the user to use the additional virtual credit card in one or more transactions to redeem the rewards stored in association with the user from use of the virtual credit card. In other embodiments, the reward stored in association with the user is applied to a subsequent purchase that the user completes with the virtual credit card (or the user is prompted whether to apply the stored reward when making a later purchase with the virtual credit card). Alternatively, the request transmitted to the online system 140 requests the online system 140 transfer the rewards stored in association with the user to a financial account of the user. For example, in response to the request, the online system 140 transfers the rewards stored in association with the user to a financial account corresponding to financial account information the online system 140 stored in association with the user. Alternatively, the user provides information to the online system 140 identifying a financial account to which the online system 140 transfer the rewards stored in association with the user. This allows the user to transfer the rewards accumulated from use of the generated virtual credit card to a financial account of the user or to use the accumulated rewards via an additional virtual credit card generated for an amount of the accumulated rewards, providing the user with greater flexibility in using rewards obtained from use of the generated virtual credit card.

Additionally, when the online system 140 later receives information for an additional order from a merchant system 130, such as the merchant system 130 from which the online system 140 received information describing the order or another online system 140, the online system 140 retrieves one or more offers stored in association with the user and evaluates the offers for applicability to the additional order. For example, the online concierge system 140 compares information identifying the merchant system 130 to merchant systems 130 specified by the information identifying the additional order to determine whether an offer stored in association with the user is applicable to the additional order. In another example, the online concierge system 140 compares information identifying the merchant system 130 and one or more products included in the additional order to merchant systems 130 and products corresponding to one or more orders stored in association with the user. In response to determining an order stored in association with the user is applicable to the additional order, the online system 140 applies the order stored in association with the user to the additional order, allowing the online system 140 to leverage one or more orders stored in association with the user to provide a benefit to the user on subsequent orders. The online system 140 transmits an identifier of the additional order or other information identifying the additional order, as well as information identifying the user to the merchant system 130 from which information describing the additional order was received, along with the selected virtual credit card information and one or more offers, allowing the merchant system 130 to identify the additional order and the user to which the selected virtual credit card or identified offer is applied/

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implement method for switching data transmission rails in a real-time web browsing session, the computer-implemented method comprising:
   receiving data regarding prior data transmission transactions of a user, each prior data transmission transaction of the user corresponding to the user's usage of a particular data transmission rail, a data transmission rail being an architecture of how data is transmitted over a network;
   training a machine learning model using supervised learning based on the prior data transmission transactions to determine probabilities of the user completing web browsing sessions, each web browsing sessions being a transaction involving an order and completing a web browsing session comprising completing the transaction, the machine learning model trained from the prior data transmission transactions and outputting a probability of the user completing a particular web browsing session;
   receiving, at an online system during the real-time web browsing session, information describing a real-time data transmission transaction, information identifying the user, and account information of a first transaction account for the user, wherein the first transaction account is associated with a first data transmission rail, the real-time data transmission transaction being in progress during the real-time web browsing session and being adapted to use the first data transmission rail to transmit data, wherein the real-time data transmission transaction includes data that is fixed at a checkout page of the web browsing session, and the first transaction account is managed by a first institution;
   applying, in real time during the real-time web browsing session, the machine learning model to the information describing the data that is fixed at the checkout page to identify an alternative transaction that is associated with a second data transmission rail, wherein the machine learning model predicts, in real time during the real-time web browsing session, the alternative transaction is associated with at least a threshold probability of having the alternative transaction to be completed by the user, wherein the machine learning model accounts for time when the user previously completed transactions that are fixed at a checkout page based on the frequency with which certain data were included in the prior data transmission transactions, and time when the prior data transmission transactions were previously received;
   identifying, in real time during the real-time web browsing session, a second transaction account that is associated with the alternative transaction identified by the machine learning model, the alternative transaction associated with a second data transmission rail, wherein the second transaction account is selected to replace the first transaction account and is associated with a second institution, the second transaction account providing a reward to the user and the reward is increased compared to using the first transaction account to complete the transaction, and wherein identifying the second transaction account comprises:
      receiving information describing the data that are fixed at the checkout page;
      receiving reward program information of a plurality of candidate transaction accounts; and
      using the information describing the data that are fixed at the checkout page and the reward program information to select one of the candidate transaction accounts;
   presenting, by the online system and in real time during the real-time web browsing session, the second transaction account associated with the second data transmission rail to the user;
   receiving, by the online system in real time during the real-time web browsing session, a selection of the second transaction account from the user;
   storing, at the online system, an association between an identifier of the user, the second transaction account, and the alternative transaction;
   transmitting, in real time during the real-time web browsing session, information describing the second transaction account from the online system to the second institution via the second data transmission rail that replaces the first data transmission rail.

2. The method of claim 1, wherein identifying the second transaction account to replace the first transaction account comprises:
   determining a category from the received information; and
   selecting a virtual credit card providing a maximum reward to the user for purchases made through merchant systems having the determined category.

3. The method of claim 2, wherein the category of the merchant system comprises a merchant category code included in the received information.

4. The method of claim 1, wherein the candidate transaction accounts are further identified by:
  identifying one or more geographic locations relevant to the order from the received information; and
  identifying one or more offers having criteria satisfied by a geographic location relevant to the order.

5. The method of claim 4, wherein the geographic location relevant to the order comprises a geographic location of a merchant system.

6. The method of claim 4, wherein the geographic location relevant to the order comprises a geographic location of the user.

7. The method of claim 1, wherein applying, in real time during the real-time web browsing session, the machine learning model to the information describing the data that is fixed at the checkout page to identify the alternative transaction comprises:
  retrieving information stored by the online system describing previously received orders identifying the user;
  identifying one or more candidate products from the previously received orders and from the order;
  applying the machine learning model to each candidate product, the machine learning model outputting a probability of the user purchasing a candidate product; and
  identifying offers relevant to one or more candidate products based on the probabilities of the user purchasing candidate products.

8. The method of claim 7, wherein identifying the offers relevant to one or more candidate products based on the probabilities of the user purchasing candidate products comprises:
  identifying an offer relevant to a candidate product having at least a threshold probability of being purchased by the user.

9. The method of claim 7, wherein identifying the offers relevant to one or more candidate products based on the probabilities of the user purchasing candidate products comprises:
  ranking the candidate products based on the probabilities of the user purchasing candidate products;
  identifying an offer relevant to a candidate product having at least a threshold position in the ranking.

10. The method of claim 7, further comprising:
  receiving at the online system, an additional order stored in association with the user identifying the user and including a candidate product for which an identified offer is relevant; and
  transmitting information describing the identified offer to a merchant system from which the additional order was received in conjunction with information identifying the additional order and information identifying the user.

11. The method of claim 1, wherein transmitting, in real time during the real-time web browsing session, information describing the second transaction account from the online system to the second institution comprises:
  transmitting the information describing the selected second transaction account from the online system and information identifying at least one of the identified one or more offers.

12. A computer program product comprising a non-transitory computer readable storage medium having instructions encoded thereon, the instructions for determining a real-time selection during a web browsing session, wherein the instructions, when executed by a processor, cause the processor to:
  receive data regarding prior data transmission transactions of a user, each prior data transmission transaction of the user corresponding to the user's usage of a particular data transmission rail, a data transmission rail being an architecture of how data is transmitted over a network;
  train a machine learning model using supervised learning based on the prior data transmission transactions to determine probabilities of the user completing web browsing sessions, each web browsing sessions being a transaction involving an order and completing a web browsing session comprising completing the transaction, the machine learning model trained from the prior data transmission transactions and outputting a probability of the user completing a particular web browsing session;
  receive, at an online system during the real-time web browsing session, information describing a real-time data transmission transaction, information identifying the user, and account information of a first transaction account for the user, wherein the first transaction account is associated with a first data transmission rail, the real-time data transmission transaction being in progress during the real-time web browsing session and being adapted to use the first data transmission rail to transmit data, wherein the real-time data transmission transaction includes data that is fixed at a checkout page of the web browsing session, and the first transaction account is managed by a first institution;
  apply, in real time during the real-time web browsing session, the machine learning model to the information describing the data that is fixed at the checkout page to identify an alternative transaction that is associated with a second data transmission rail, wherein the machine learning model predicts, in real time during the real-time web browsing session, the alternative transaction is associated with at least a threshold probability of having the alternative transaction to be completed by the user, wherein the machine learning model accounts for time when the user previously completed transactions that are fixed at a checkout page based on the frequency with which certain data were included in the prior data transmission transactions, and time when the prior data transmission transactions were previously received;
  identify, in real time during the real-time web browsing session, a second transaction account that is associated with the alternative transaction identified by the machine learning model, the alternative transaction associated with a second data transmission rail, wherein the second transaction account is selected to replace the first transaction account and is associated with a second institution, the second transaction account providing a reward to the user and the reward is increased compared to using the first transaction account to complete the transaction, and wherein identifying the second transaction account comprises:
    receiving information describing the data that are fixed at the checkout page;
    receiving reward program information of a plurality of candidate transaction accounts; and using the information describing the data that are fixed at the checkout page and the reward program information to select one of the candidate transaction accounts;

present, by the online system and in real time during the real-time web browsing session, the second transaction account associated with the second data transmission rail to the user;

receive, by the online system in real time during the real-time web browsing session, a selection of the second transaction account from the user;

store, at the online system, an association between an identifier of the user, the second transaction account, and the alternative transaction;

transmit, in real time during the real-time web browsing session, information describing the second transaction account from the online system to the second institution via the second data transmission rail that replaces the first data transmission rail.

13. The computer program product of claim 12, wherein identify the second transaction account to replace the first transaction account comprises:

determine a category from the received information; and select a virtual credit card providing a maximum reward to the user for purchases made through merchant systems having the determined category.

14. The computer program product of claim 13, wherein the category of the merchant system comprises a merchant category code included in the received information.

15. The computer program product of claim 12, wherein the candidate transaction accounts are further identified by:

identify one or more geographic locations relevant to the order from the received information; and identify one or more offers having criteria satisfied by a geographic location relevant to the order.

16. The computer program product of claim 15, wherein the geographic location relevant to the order comprises a geographic location of a merchant system.

17. The computer program product of claim 15, wherein the geographic location relevant to the order comprises a geographic location of the user.

18. The computer program product of claim 12, wherein apply, in real time during the real-time web browsing session, the machine learning model to the information describing the data that is fixed at the checkout page to identify the alternative transaction comprises:

retrieve information stored by the online system describing previously received orders identifying the user;

identify one or more candidate products from the previously received orders and from the order;

apply the machine learning model to each candidate product, the machine learning model outputting a probability of the user purchasing a candidate product; and identify offers relevant to one or more candidate products based on the probabilities of the user purchasing candidate products.

19. The computer program product of claim 18, wherein identify the offers relevant to one or more candidate products based on the probabilities of the user purchasing candidate products comprises:

identify an offer relevant to a candidate product having at least a threshold probability of being purchased by the user.

20. The computer program product of claim 18, wherein identifying the offers relevant to one or more candidate products based on the probabilities of the user purchasing candidate products comprises:

ranking the candidate products based on the probabilities of the user purchasing candidate products;

identifying an offer relevant to a candidate product having at least a threshold position in the ranking.

21. The computer program product of claim 18, wherein the non-transitory computer readable storage medium further has instructions encoded thereon that, when executed by the processor, cause the processor to:

receive at the online system, an additional order stored in association with the user identifying the user and including a candidate product for which an identified offer is relevant; and transmit information describing the identified offer to a merchant system from which the additional order was received in conjunction with information identifying the additional order and information identifying the user.

22. The computer program product of claim 12, wherein the non-transitory computer readable storage medium further has instructions encoded thereon that, when executed by the processor, cause the processor to:

transmit the information describing the selected second transaction account from the online system and information identifying one or more offers to a merchant system.

* * * * *